United States Patent
Chen et al.

(10) Patent No.: US 12,183,490 B2
(45) Date of Patent: Dec. 31, 2024

(54) HYBRID CIRCUIT PROTECTION DEVICE

(71) Applicant: FUZETEC TECHNOLOGY CO., LTD., New Taipei (TW)

(72) Inventors: Jack Jih-Sang Chen, New Taipei (TW); Chang Hung Jiang, New Taipei (TW)

(73) Assignee: FUZETEC TECHNOLOGY CO., LTD., New Taipei (TW)

( * ) Notice: Subject to any disclaimer, the term of this patent is extended or adjusted under 35 U.S.C. 154(b) by 378 days.

(21) Appl. No.: 17/747,395

(22) Filed: May 18, 2022

(65) Prior Publication Data

US 2023/0377780 A1    Nov. 23, 2023

(51) Int. Cl.
*H01C 7/02* (2006.01)
*H01C 1/14* (2006.01)
*H01C 7/12* (2006.01)

(52) U.S. Cl.
CPC .......... *H01C 7/028* (2013.01); *H01C 1/1406* (2013.01); *H01C 7/027* (2013.01); *H01C 7/12* (2013.01)

(58) Field of Classification Search
CPC ...... H01C 7/028; H01C 7/027; H01C 1/1406; H01C 7/12
See application file for complete search history.

(56) References Cited

U.S. PATENT DOCUMENTS

| | | | | |
|---|---|---|---|---|
| 6,700,766 | B2 * | 3/2004 | Sato | H02H 9/042 361/93.1 |
| 8,508,328 | B1 * | 8/2013 | Chen | H01C 7/02 338/21 |
| 9,743,466 | B2 * | 8/2017 | Tao | H05B 47/24 |
| 2007/0025044 | A1 * | 2/2007 | Golubovic | H01C 7/102 361/124 |

FOREIGN PATENT DOCUMENTS

| | | | |
|---|---|---|---|
| CN | 106972474 A | * 7/2017 | |
| DE | 102013005783 A1 | * 4/2014 | H01H 39/006 |

OTHER PUBLICATIONS

DE102013005783 machine translation. (Year: 2014).*
CN106972474 machine translation. (Year: 2017).*

* cited by examiner

*Primary Examiner* — Kyung S Lee

(57) ABSTRACT

A hybrid circuit protection device includes a positive temperature coefficient (PTC) component, a voltage-dependent resistor, a gas discharge tube (GDT), and first and second conductive leads that are respectively connected to the PTC component and the GDT. The voltage-dependent resistor and the PTC component are electrically connected in series, the GDT is electrically connected to the voltage-dependent resistor and the PTC component, and the GDT has a breakdown voltage greater than a varistor voltage of the voltage-dependent resistor as determined at 1 mA.

24 Claims, 5 Drawing Sheets

HYBRID CIRCUIT PROTECTION DEVICE

FIELD

The disclosure relates to a circuit protection device, and more particularly to a hybrid circuit protection device.

BACKGROUND

U.S. Pat. No. 8,508,328 B1 discloses an insertable polymer positive temperature coefficient (PPTC) over-current protection device that includes: first and second electrodes; a solder material; conductive lead pins bonded to the first and second electrodes; and a PTC polymer matrix laminated between the first and second electrodes. The PTC polymer matrix is formed with at least one hole that has sufficient volume to accommodate thermal expansion of the PTC polymer matrix when the temperature of the PTC polymer matrix is increased.

Electrical properties (e.g., operating current and high-voltage surge endurability) of the PPTC over-current protection device are important for preventing power surge. When the operating current of the PPTC over-current protection device is increased by increasing the area of the PTC polymer matrix, it may become more vulnerable to power surge.

Although a voltage-dependent resistor could be combined with the PPTC component to impart over-current and over-voltage protection to the resultant composite circuit protection device, the voltage-dependent resistor might only withstand a power surge for a short time period (such as 0.001 seconds). That is, if the time period of the power surge exceeds a cut-off time period, the voltage-dependent resistor might burn out or be damaged due to over-current and over-voltage, causing permanent loss of function of the composite circuit protection device.

SUMMARY

Therefore, an object of the disclosure is to provide a hybrid circuit protection device that can alleviate at least one of the drawbacks of the prior art.

According to the present disclosure, the hybrid circuit protection device includes a positive temperature coefficient (PTC) component, a voltage-dependent resistor, a gas discharge tube (GDT), and first and second conductive leads that are respectively connected to the PTC component and the GDT. The voltage-dependent resistor and the PTC component are electrically connected in series, the GDT is electrically connected to the voltage-dependent resistor and the PTC component, and the GDT has a breakdown voltage greater than a varistor voltage of the voltage-dependent resistor as determined at 1 mA.

BRIEF DESCRIPTION OF THE DRAWINGS

Other features and advantages of the disclosure will become apparent in the following detailed description of the embodiment(s) with reference to the accompanying drawings, of which.

DETAILED DESCRIPTION

Figure 1:
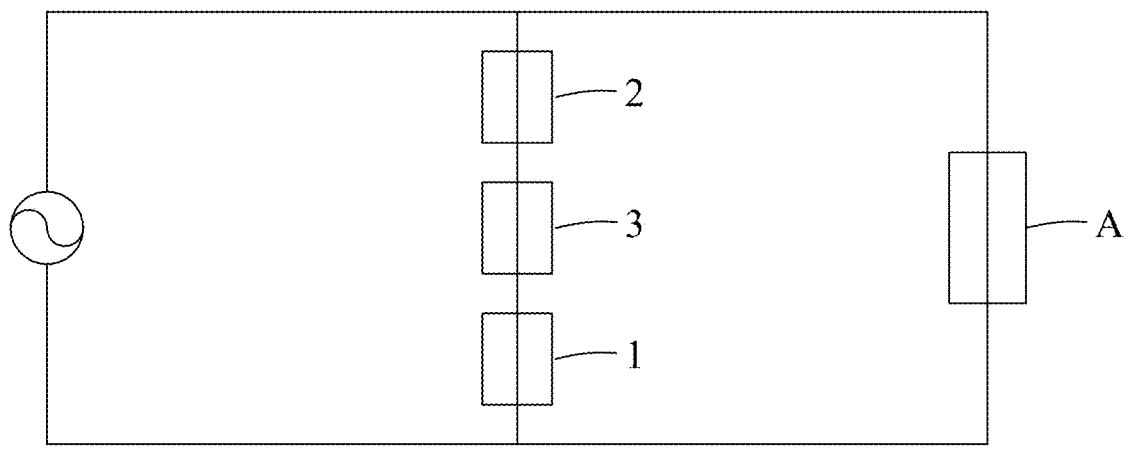
FIG. 1 is a schematic electrical diagram of a first embodiment of a hybrid circuit protection device according to the present disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
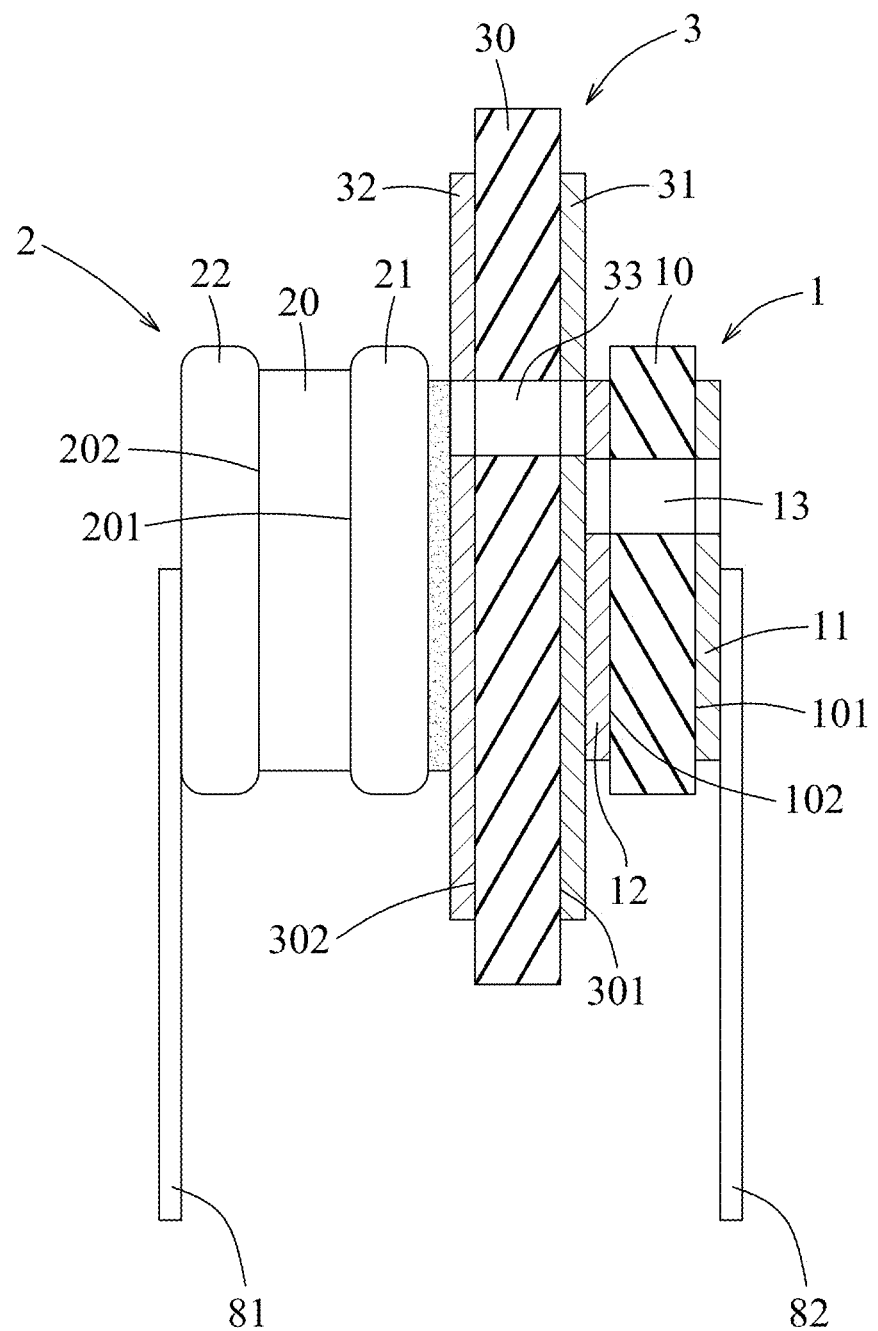
FIG. 2 is a schematic sectional view of the first embodiment of the hybrid circuit protection device.

Referring to FIGS. 1 and 2, a first embodiment of a hybrid circuit protection device for protecting a circuit device (A) according to the present includes a positive temperature disclosure coefficient (PTC) component 1, a gas discharge tube (GDT) 2, a voltage-dependent resistor 3, first and second conductive leads 81, 82 that are respectively connected to the PTC component 1 and the GDT 2. The voltage-dependent resistor 3 and the PTC component 1 are electrically connected in series, and the GDT 2 is electrically connected to the voltage-dependent resistor 3 and the PTC component 1. The GDT 2 has a breakdown voltage greater than a varistor voltage of the voltage-dependent resistor 3 as determined at 1 mA. In some embodiments, the voltage-dependent resistor 3 is sandwiched between the PTC component 1 and the GDT 2.

In some embodiments, the PTC component 1 includes a PTC layer 10 that has two opposite surfaces 101, 102, and first and second electrode layers 11, 12 that are respectively disposed on the two opposite surfaces 101, 102 of the PTC layer 10. In certain embodiments, the first and second electrode layers 11, 12 are respectively connected to the two opposite surfaces 101, 102 of the PTC layer 10 through a solder material. Each of the first and second electrode layers 11, 12 has a peripheral edge.

The GDT 2 includes a GDT body 20 that has two opposite surfaces 201, 202, and third and fourth electrode layers 21, 22 that are respectively disposed on the two opposite surfaces 201, 202 of the GDT body 20. In certain embodiments, the third and fourth electrode layers 21, 22 are respectively connected to the two opposite surfaces 201, 202 of the GDT body 20 through a solder material. Each of the third and fourth electrode layers 21, 22 has a peripheral edge.

The voltage-dependent resistor 3 includes a voltage-dependent resistor layer 30 that has two opposite surfaces 301, 302, a fifth electrode layer 31, and a sixth electrode layer 32. The fifth electrode layer 31 is disposed on one of the two opposite surfaces 301, 302 of the voltage-dependent resistor layer 30 (in FIG. 2, the fifth electrode layer 31 is disposed on the surface 301), and is adjacent to the second electrode layer 12 of the PTC component 1. The sixth electrode layer 32 is disposed on the other one of the two opposite surfaces 301, 302 of the voltage-dependent resistor layer 30, and is adjacent to the third electrode layer 21 of the GDT 2. In certain embodiments, the fifth and sixth electrode layers 31, 32 are respectively connected to the two opposite surfaces 301, 302 of the voltage-dependent resistor layer 30 through a solder material. Each of the fifth and sixth electrode layers 31, 32 has a peripheral edge.

The first conductive lead 81 is connected to the fourth electrode layer 22 of the GDT 2 2 through a solder material, and the second conductive lead 82 is connected to the first electrode layer 11 of the PTC component 1 through a solder material. Each of the first and second conductive leads 81, 82 extends in a direction along a surface of a corresponding one of the electrode layers to which the each of the conductive leads 81, 82 is connected.

In certain embodiments, each of the first and second electrode layers 11, 12 of the PTC component 1 has a surface substantially parallel to corresponding one of the two opposite surfaces 101, 102 on which the each of the first and second electrode layers 11, 12 is disposed. The surface of each of the first and second electrode layers 11, 12 has a surface area not greater than 90% of a surface area of the corresponding one of the two opposite surfaces 101, 102 on which the each of the first and second electrode layers 11, 12 is disposed.

In certain embodiments, each of the fifth and sixth electrode layers 31, 32 of the voltage-dependent resistor 3 has a surface substantially parallel to a corresponding one of the two opposite surfaces 301, 302 on which the each of the fifth and sixth electrode layers 31, 32 is disposed. The surface of each of the fifth and sixth electrode layers 31, 32 has a surface area not greater than 90% of a surface area of the corresponding one of the two opposite surfaces 301, 302 on which the each of the fifth and sixth electrode layers 31, 32 is disposed.

In some embodiments, the breakdown voltage of the GDT 2 may be greater than 110% of the varistor voltage of the voltage-dependent resistor 3 as determined at 1 mA. In some embodiments, the breakdown voltage of the GDT 2 may be greater than 116% of the varistor voltage of the voltage-dependent resistor 3 as determined at 1 mA.

In some embodiments, the PTC component 1 may be a polymer PTC (PPTC) component 1. In this embodiment, the PPTC component 1 trips before one of the GDT 2 and the voltage-dependent resistors 3 burns out in the presence of an over-current or an over-voltage. In certain embodiments, the PPTC component 1 trips from 0.00001 seconds to within 10 seconds in the presence of an over-current or an over-voltage. In certain embodiments, the PPTC component 1 trips from 0.001 seconds to within 10 seconds in the presence of an over-current that is not less than 0.5 A or an over-voltage that is greater than a breakdown voltage of the GDT 2 or a varistor voltage of the voltage-dependent resistor 3. In certain embodiments, the PPTC component 1 trips from 0.001 seconds to within 10 seconds in the presence of an over-current that is not less than 10 A or an over-voltage that is greater than a breakdown voltage of the GDT 2 or a varistor voltage of the voltage-dependent resistor 3.

In certain embodiments, the PTC component 1 is formed with at least one hole 13 (see FIG. 2). The hole 13 is formed in the PTC layer 10. The PTC layer 10 of the PTC component 1 has a peripheral edge that defines a boundary of the PTC layer 10 and interconnects the two opposite surfaces 101, 102 of the PTC layer 10. The hole 13 is spaced apart from the peripheral edge, and has a sufficient volume to accommodate thermal expansion of the PTC layer 10 when the temperature of the PTC layer 10 is increased, so as to avoid undesired structural deformation of the PTC layer 10, which may be disadvantageous for electrical properties (e.g., operating current and high-voltage surge durability) of the PTC layer 10. In certain embodiments, the hole 13 extends through at least one of the two opposite surfaces 101, 102 of the PTC layer 10. In certain embodiments, the hole 13 further extends through at least one of the first and second electrode layers 11, 12. In this embodiment, the hole 13 extends through the two opposite surfaces 101, 102 of the PTC layer 10 and the first and second electrode layers 11, 12, so as to form a through hole. In some embodiments, the hole 13 extends along a line passing through a geometric center of the PTC component 1 and transverse to the opposite surfaces 101, 102 of the PTC layer 10. The hole 13 is defined by a hole-defining wall which has a cross section that is parallel to the two opposite surfaces 101, 102 of the PTC layer 10. The cross section of the hole-defining wall is in the shape of a circle, square, oval, triangle, crisscross, or etc.

In certain embodiments, the voltage-dependent resistor 3 is formed with at least one hole 33 (see FIG. 2). The hole 33 is formed in the voltage-dependent resistor layer 30. The voltage-dependent resistor layer 30 of the voltage-dependent resistor 3 has a peripheral edge that defines a boundary of the voltage-dependent resistor and layer 30 interconnects the two opposite surfaces 301, 302 of the voltage-dependent resistor layer 30. The hole 33 is spaced apart from the peripheral edge, and has sufficient volume to accommodate thermal expansion of the voltage-dependent resistor layer 30 when the temperature of the voltage-dependent resistor layer 30 is increased, so as to avoid undesired structural deformation of the voltage-dependent resistor layer 30, which may be disadvantageous for the electrical properties of the voltage-dependent resistor layer 30. In certain embodiments, the hole 33 extends through at least one of the two opposite surfaces 301, 302 of the voltage-dependent resistor layer 30. In certain embodiments, the hole 33 further extends through at least one of the fifth and sixth electrode layers 31, 32. In this embodiment, the hole 33 extends through the two opposite surfaces 301, 302 of the voltage-dependent resistor 3 and the fifth and sixth electrode layers 31, 32, so as to form a through hole. In some embodiments, the hole 33 extends along a line passing through a geometric center of the voltage-dependent resistor 3 and transverse to the opposite surfaces 301, 302 of the voltage-dependent resistor layer 30. The hole 33 is defined by a hole-defining wall which has a cross section parallel to the two opposite surfaces 301, 302 of the voltage-dependent resistor layer 30. The cross section of the hole-defining wall is in the shape of a circle, square, oval, triangle, crisscross, or etc.

According to the present disclosure, the PTC layer 10 of the PTC component 1 includes a PTC matrix and a conductive filler dispersed in the PTC matrix. The PTC matrix may have a composition that contains a non-grafted olefin-based polymer. In certain embodiments, the non-grafted olefin-based polymer may be, but not limited to, high density polyethylene (HDPE). In certain embodiments, the composition of the PTC matrix may further include a grafted olefin-based polymer. In certain embodiments, the grafted olefin-based polymer may be, but not limited to, unsaturated carboxylic acid anhydride-grafted olefin-based polymer, e.g., a maleic anhydride-grafted olefin-based polymer. Examples of the conductive filler suitable for use in this disclosure include, but are not limited to, carbon black, metal powders, conductive ceramic powders, and combinations thereof.

In certain embodiments, the voltage-dependent resistor 3 includes a metal-oxide material. In some embodiments, the voltage-dependent resistor 3 may be a metal-oxide varistor (i.e., a type of voltage-dependent resistor).

Figure 3:
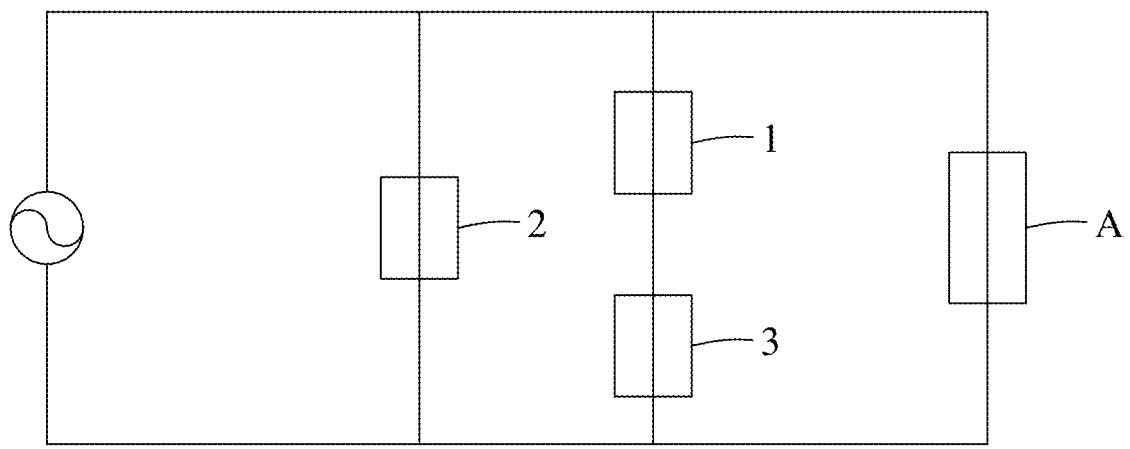
FIG. 3 is a schematic electrical diagram of a second embodiment of the hybrid circuit protection device according to the present disclosure.
Figure 4:
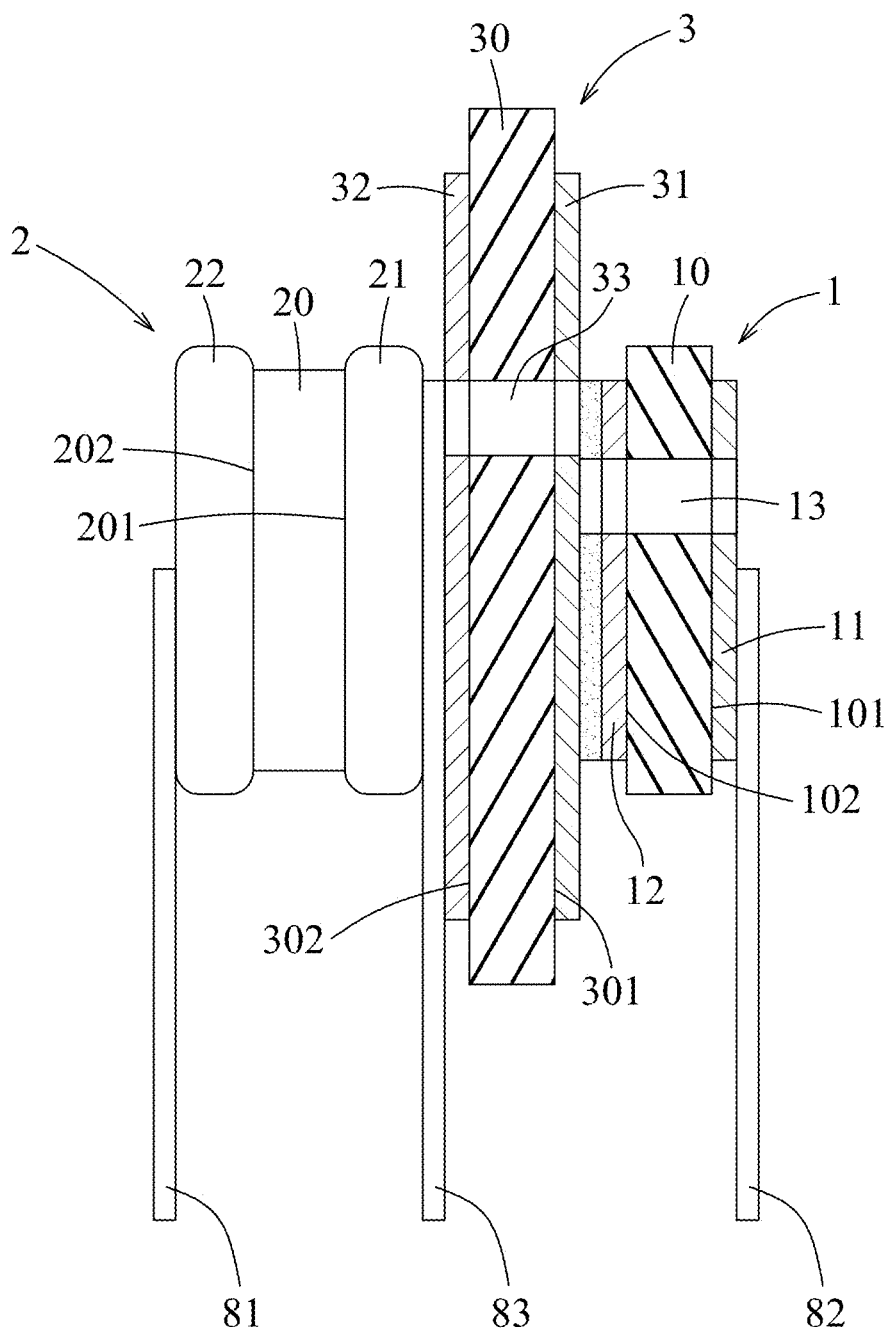
FIG. 4 is a schematic sectional view of the second embodiment of the hybrid circuit protection device.

FIGS. 3 and 4 illustrate a second embodiment of the hybrid circuit protection device according to the present disclosure is provided. Referring to FIG. 4, the second embodiment of the hybrid circuit protection device is similar to the first embodiment, except that the second embodiment further includes a third conductive lead 83 that is connected and that is disposed between the third electrode layer 21 of the GDT 2 and the sixth electrode layer 32 of the voltage-dependent resistor 3. As shown in FIG. 3, in the second embodiment of the hybrid circuit protection device, the PTC component 1 and the voltage-dependent resistor 3 are electrically connected in series, and the GDT 2 is connected to the series connection of the PTC component 1 and the voltage-dependent resistor 3 in parallel. The voltage-dependent resistor 3 is sandwiched between the PTC component 1 and the GDT 2. In this embodiment, the GDT 2 is electrically connected to the circuit device (A) in parallel. Each of the first, second and third conductive leads 81, 82, 83 extends in a direction along a surface of a corresponding one of the electrode layers to which the each of the conductive leads 81, 82, 83 is connected.

Figure 5:
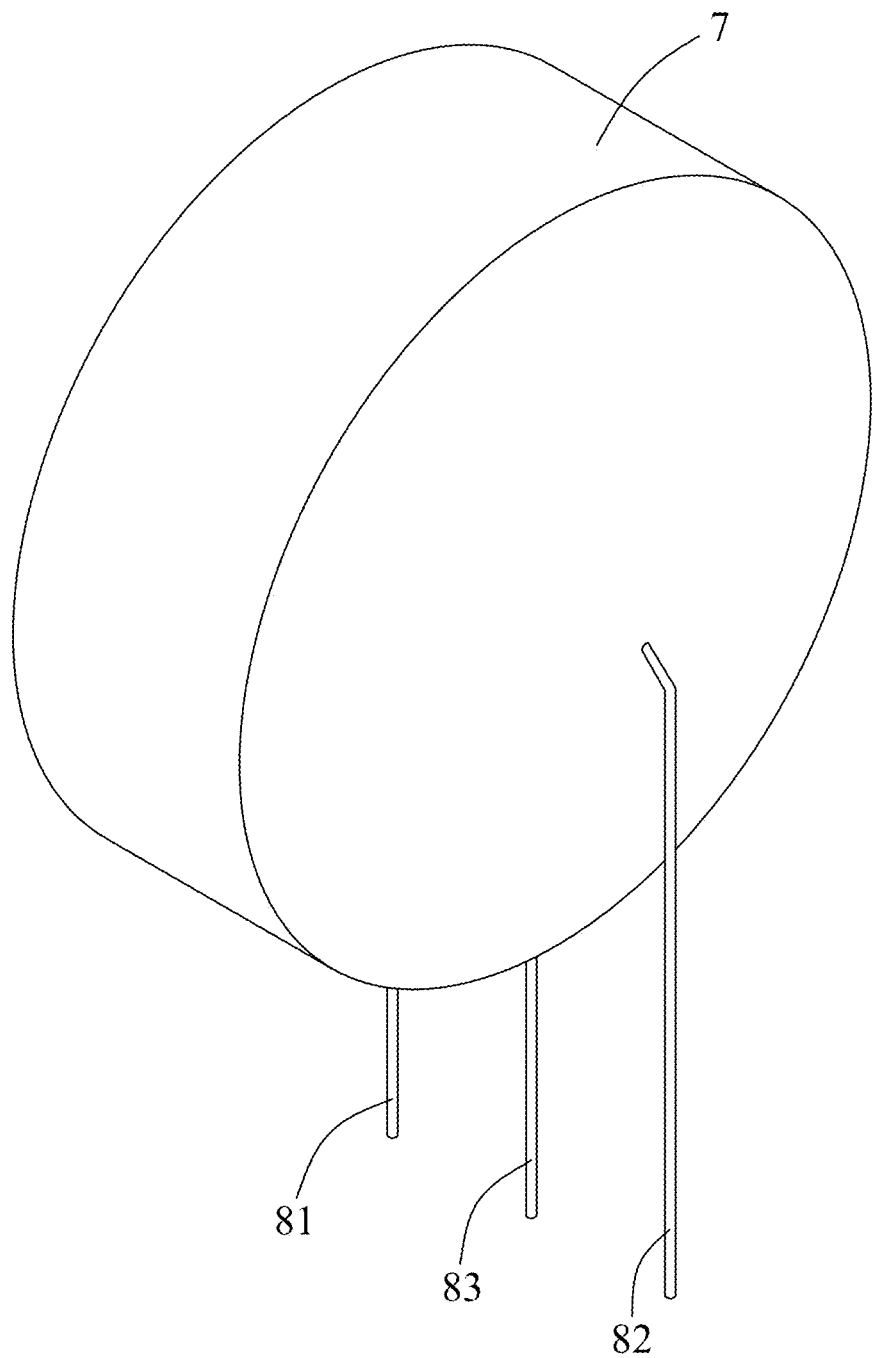
FIG. 5 is a perspective view of a third embodiment of the hybrid circuit protection device according to the present disclosure.

FIG. 5 illustrates a third embodiment of the hybrid circuit protection device according to the present disclosure. Referring to FIG. 5, the third embodiment of the hybrid circuit protection device according to the present disclosure has a structure similar to that of the second embodiment, except that the third embodiment further includes an encapsulant 7 that encloses the PTC component 1, the GDT 2, the voltage-dependent resistor 3, a portion of the first conductive lead 81, a portion of the second conductive lead 82, and a portion of the third conductive lead 83. In certain embodiments, the encapsulant 7 is made from epoxy resin.

The disclosure will be further described by way of the following examples and comparative examples. However, it should be understood that the following examples are solely intended for the purpose of illustration and should not be construed as limiting the disclosure in practice.

EXAMPLES

Example 1 (E1)

10 grams of HDPE (purchased from *Formosa* Plastics® Corp., catalog no.: HDPE9002) serving as the non-grafted olefin-based polymer, 10 grams of maleic anhydride-grafted HDPE (purchased from Dupont™ de Nemours, Inc., catalog no.: MB100D) serving as the carboxylic acid anhydride-grafted olefin-based polymer, 15 grams of carbon black powder (purchased from Columbian Chemicals™ Co., catalog no.: Raven® 430UB, serving as the conductive filler), and 15 grams of magnesium hydroxide (purchased from Martin Marietta Magnesia Specialties™, LLC, MagChem® MH 10) were compounded in a Brabender mixer. The compounding temperature was 200° C., the stirring rate was 30 rpm, and the compounding time was 10 minutes.

The compounded mixture was hot pressed in a mold so as to form a thin PTC polymeric (PPTC) layer having thickness of 1.5 mm. The hot pressing temperature was 200° C., the hot pressing time was 4 minutes, and the hot pressing pressure was 80 kg/cm². Two copper foil sheets (serving as the first electrode layer 11 and the second electrode layer 12, were respectively attached two respectively) opposite surfaces of the PPTC layer and were hot pressed under 200° C. and 80 kg/cm² for 4 minutes to form a sandwiched structure of a PPTC laminate having a thickness of 2.2 mm. The PPTC laminate was then cut into a plurality of PPTC chips each having a circular shape (diameter: 14.5 mm, area: 165.0 mm²; diameter of each of the electrode layers: 13.7 mm, area of each of the electrode layers: 147.3 mm²). Thereafter, each PPTC chip (serving as the PTC component 1) was irradiated with a Cobalt-60 gamma ray for a total irradiation dose of 150 kGy.

A first metal-oxide varistor (MOV-1, serving as the voltage-dependent resistor 3, purchased from Ceramate Technical™ Corp., Model No: 20D361K, diameter: 20.0 mm, area: 314.0 mm²), including two electrodes (i.e., the aforesaid fifth and sixth electrode layers 31, 32, each with a diameter of 18.9 mm and an area of 280.4 mm²) was connected to the PPTC chip with the fifth electrode layer 31 being welded to the second electrode layer 12 of the PPTC chip. A GDT (serving as the GDT 2, purchased from Unictron Technologies™ Corp., Model No.: JN2R420M), including two electrodes (i.e., the aforesaid third and fourth electrode layers 21, 22) was provided, and the third electrode layer 21 of the GDT 2 was welded to the sixth electrode layer 32 of the first metal-oxide varistor (i.e., the MOV-1). Two conductive leads (serving as the first conductive lead 81 and the second conductive lead 82) were respectively welded to the fourth electrode layer 22 of the GDT 2 and the first electrode layer 11 of the PTC chip so as to form a hybrid circuit protection device as shown in FIGS. 1 and 2.

In E1, the MOV-1 was electrically connected to the PPTC chip in series, and the GDT 2 was electrically connected to the PPTC chip in series.

The PPTC chip was subjected to determination of a hold current (i.e., a maximum current value which can be applied in normal operation), a trip current (i.e., a minimum current value which is necessary for a PPTC component to achieve a high-resistance state), a rated voltage (i.e., a voltage at which the PPTC component is designed to work with) and a withstand voltage (i.e., a maximum voltage limit where the PPTC component will not malfunction or be damaged) according to the Underwriter Laboratories UL® 1434 Standard for Safety for Thermistor-Type Devices. In addition, the MOV-1 was subjected to determination of a varistor voltage (i.e., a voltage at which an MOV component is designed to work with), a maximum peak current (i.e., a maximum amount of current that an MOV component can withstand for a brief period of time), and a clamping voltage (i.e., a maximum voltage that an MOV component can endure) according to the Underwriter Laboratories UL® 1434 1449 Standard for Safety for Transient Voltage Surge Suppressors. The GDT 2 was subjected to determination of a direct current (DC) breakdown voltage (i.e., a maximum voltage that a GDT can endure under a predetermined amount of direct current) and a maximum peak current (i.e., a maximum amount of current that a GDT can withstand for a brief period of time) according to the Underwriter Laboratories UL® 1434 1449 Standard for Safety for Transient Voltage Surge Suppressors. Maximum peak currents of the MOV-1 and the GDT 2 are determined by using a multiple impulse generator (purchased from EMC Master Instrument™ Co., Ltd., model no.: MIG0624LP1) with a 8/20 μs current waveform.

The characteristic results are shown in Tables 1, 2, and 3.

TABLE 1

|  | Hold Current (A) | Trip Current (A) | Rated Voltage (V) | Withstand Voltage (V) |
| --- | --- | --- | --- | --- |
| PPTC chip | 0.08 | 0.16 | 250 | 250 |

TABLE 2

|  | Varistor voltage[a] | Clamping Voltage[b] | Maximum Peak Current[c] |
| --- | --- | --- | --- |
| MOV-1 | 360 V | 595 V | 6500 A |

[a]: determined at 1 mA
[b]: determined at a test pulse waveform μs and a test pulse current (Ip) = 50 A (tp) = 8/20
[c]: determined at a test pulse waveform (tp) = 8/20 μs

TABLE 3

| | DC Breakdown Voltage[d] | Maximum Peak Current[e] |
|---|---|---|
| GDT | 420 V | 5000 A |

[d]: determined at 1 mA
[e]: determined at a test pulse waveform (tp) = 8/20 μs

Example 2 (E2)

The structure of the hybrid circuit protection device of E2 was similar to that of E1, except that a circular through hole was formed in the MOV-1 (having a diameter (d) of 1.5 mm and a hole area ($\Pi d^2/4$) of 1.77 mm$^2$) (see Table 5).

Example 3 (E3)

The structure of the hybrid circuit protection device of E3 was similar to that of E1, except that a circular through hole was formed in the PPTC chip (having a diameter (d) of 1.5 mm and a hole area ($\Pi d^2/4$) of 1.77 mm$^2$) (see Table 5).

Example 4 (E4)

The structure of the hybrid circuit protection device of E4 was similar to that of E2, except that a circular through hole was formed in the PPTC chip (having a diameter (d) of 1.5 mm and a hole area ($\Pi d^2/4$) of 1.77 mm$^2$) (see Table 5).

Example 5 (E5)

The structure of the hybrid circuit protection device of E5 is similar to that of E1, except that a third conductive lead 83 was welded to and between the sixth electrode layer 32 of the MOV-1 and the third electrode layer 21 of the GDT 2 so as to form a hybrid circuit protection device as shown in FIGS. 3 and 4. In E5, the GDT 2 was electrically connected in parallel to the series connection of the MOV-1 and the PPTC chip (see FIG. 3). The MOV-1 was sandwiched between the PPTC chip and the GDT 2.

Example 6 (E6)

The structure of the hybrid circuit protection device of E6 is similar to that of E5, except that a circular through hole is formed in the MOV-1 (having a diameter (d) of 1.5 mm and a hole area ($\Pi d^2/4$) of 1.77 mm$^2$) (see Table 5).

Example 7 (E7)

The structure of the hybrid circuit protection device of E7 is similar to that of E5, except that a circular through hole is formed in the PPTC chip (having a diameter (d) of 1.5 mm and a hole area ($\Pi d^2/4$) of 1.77 mm$^2$) (see Table 5).

Example 8 (E8)

The structure of the hybrid circuit protection device of E8 is similar to that of E6, except that a circular through hole is formed in the PPTC chip (having a diameter (d) of 1.5 mm and a hole area ($\Pi d^2/4$) of 1.77 mm$^2$) (see Table 5).

Comparative Examples 1 and 2 (CE1 and CE2)

A testing device of CE1 included only the voltage-dependent resistor 3 (MOV-1) used in E1. A testing device of CE2 included only the GDT 2 used in E1 (see Table 5).

Comparative Example 3 (CE3)

A testing device of CE3 is similar to CE1 except that the voltage-dependent resistor 3 (MOV-1) used in CE1 was replaced by a second metal-oxide varistor (MOV-2, purchased from Ceramate Technical™ Corp., Model No: 20D431K, diameter: 20.0 mm, area: 314.0 mm$^2$, including two electrodes (seventh and eighth electrode layers (not shown), each with an electrode layer diameter of 18.9 mm, and an electrode layer area of 280.4 mm$^2$) (see Table 5).

MOV-2 was subjected to determination of a varistor voltage (i.e., a voltage at which an MOV component is designed to work with) and a clamping voltage (i.e., a maximum voltage that an MOV component can endure) according to the Underwriter Laboratories UL® 1449 Standard for Safety for Transient Voltage Surge Suppressors. A maximum peak current of the MOV-2 is determined by using a multiple impulse generator (purchased from EMC Master Instrument™ Co., Ltd., model no.: MIG0624LP1) with a 8/20 μs current waveform.

The characteristic results are shown in Table 4.

TABLE 4

| | Varistor voltage[a] | Clamping Voltage[b] | Maximum Peak Current[c] |
|---|---|---|---|
| MOV-2 | 430 V | 710 V | 6500 A |

[a]: determined at 1 mA
[b]: determined at a test pulse waveform (tp) = 8/20 μs and a test pulse current (IP) = 50 A
[c]: determined at a test pulse waveform (tp) = 8/20 μs

Comparative Examples 4 to 7 (CE4 to CE7)

The procedures and conditions in preparing the hybrid circuit protection devices of CE4 to CE7 were similar to that of E1 except that, the GDT 2 was not included in CE4 to CE7. In addition, the PPTC chip of the hybrid circuit protection device of CE5 was formed with a circular through hole, the MOV-1 of the hybrid circuit protection device of CE6 was formed with a circular through hole, and each of the MOV-1 and the PPTC chip of the hybrid circuit protection device of CE7 was formed with a circular through hole. Each circular through hole has a diameter of 1.5 mm and the position thereof was the same as that in E4) (see Table 5).

Comparative Examples 8 and 9 (CE8 and CE9)

The procedures and conditions in preparing the hybrid circuit protection devices of CE8 and CE9 were similar to that of CE4 except that, the GDT 2 was disposed in the position where the MOV-1 is located in CE4 (i.e., in CE8 and CE9, the GDT 2 was electrically connected to the PPTC chip in series). In addition, the PPTC chip of the hybrid circuit protection device of CE9 was formed with a circular through hole (the circular through hole having a diameter of 1.5 mm and being disposed at a position same as that in E7) (see Table 5).

Comparative Examples 10 to 17 (CE10 to CE17)

The procedures and conditions in preparing the hybrid circuit protection devices of CE10 to CE17 were similar to that of E1 except that, in each of CE10 to CE17, the second voltage-dependent resistor (MOV-2) was disposed in the position where the GDT 2 was located in E1. That is, in each of CE10 to CE17, the MOV-1 and the PPTC chip were electrically connected in series, and the MOV-2 and the PPTC chip were electrically connected in series. In addition, the MOV-1 of the hybrid circuit protection device of CE11 was formed with a circular through hole, the PPTC chip of the hybrid circuit protection device of CE12 was formed with a circular through hole, the MOV-1 and the PPTC chip of the hybrid circuit protection device of CE13 were both formed with a circular through hole, the MOV-2 of the hybrid circuit protection device of CE14 was formed with a circular through hole, the MOV-1 and the MOV-2 of the hybrid circuit protection device of CE15 were both formed with a circular through hole, the MOV-2 and the PPTC chip of the hybrid circuit protection device of CE16 were both formed with a circular through hole, and the MOV-2, the MOV-1, and the PPTC chip of the hybrid circuit protection device of CE17 were formed with a circular through hole (the circular through hole having a diameter of 1.5 mm and being disposed at a position the same as that in E8) (see Table 5).

The structure of the devices of E1 to E8 and CE1 to CE17 are summarized in Table 5, where V is an indicator for existence. In addition, position 1 in Layout of FIG. 1 indicated in Table 5 stands for the position of GDT or MOV at which the GDT or the MOV is electrically connected to the PPTC chip in series, and position 2 in Layout of FIG. 1 indicated in Table 5 stands for the position of GDT or MOV at which the GDT or the MOV is electrically connected to the PPTC chip in series (see FIG. 1). Furthermore, position 2 in Layout of FIG. 3 indicated in Table 5 stands for the position of MOV at which the MOV is electrically connected to the PPTC chip in series, and position 1 in Layout of FIG. 3 indicated in Table 5 stands for the position of GDT at which the GDT is electrically connected to the series connection of the PPTC chip and the MOV in parallel (see FIG. 3).

TABLE 5

| | Hybrid circuit protection device | | | | | |
|---|---|---|---|---|---|---|
| | Position 1 voltage-dependent resistor | | Position 2 voltage-dependent resistor | | PTC component | Layout of FIG. |
| | Type | Hole | Type | Hole | PPTC chip | Hole | |
| E1 | GDT | | MOV-1 | | V | | 1 |
| E2 | GDT | | MOV-1 | V | V | | 1 |
| E3 | GDT | | MOV-1 | | V | V | 1 |
| E4 | GDT | | MOV-1 | V | V | V | 1 |
| E5 | GDT | | MOV-1 | | V | | 3 |
| E6 | GDT | | MOV-1 | V | V | | 3 |
| E7 | GDT | | MOV-1 | | V | V | 3 |
| E8 | GDT | | MOV-1 | V | V | V | 3 |
| CE1 | MOV-1 | | | | | | 1 |
| CE2 | GDT | | | | | | 1 |
| CE3 | MOV-2 | | | | | | 1 |
| CE4 | | | MOV-1 | | V | | 1 |
| CE5 | | | MOV-1 | | V | V | 1 |
| CE6 | | | MOV-1 | V | V | | 1 |
| CE7 | | | MOV-1 | V | V | V | 1 |
| CE8 | | | GDT | | V | | 1 |
| CE9 | | | GDT | | V | V | 1 |
| CE10 | MOV-2 | | MOV-1 | | V | | 1 |
| CE11 | MOV-2 | | MOV-1 | V | V | | 1 |
| CE12 | MOV-2 | | MOV-1 | | V | V | 1 |
| CE13 | MOV-2 | | MOV-1 | V | V | V | 1 |
| CE14 | MOV-2 | V | MOV-1 | | V | | 1 |
| CE15 | MOV-2 | V | MOV-1 | V | V | | 1 |
| CE16 | MOV-2 | V | MOV-1 | | V | V | 1 |
| CE17 | MOV-2 | V | MOV-1 | V | V | V | 1 |

Performance Test
Leakage Current Test

Ten hybrid circuit protection devices of each of E1 to E8 and CE1 to CE17, serving as test devices, were subjected to a leakage current test.

The leakage current test was performed using a varistor tester (MOV-168EP, Think Technologies™ Co., Ltd.). The leakage current test for each test device was conducted under 25° C. in the presence of a voltage of 300 Vdc so as to measure the maximum leakage current of each test device. The results are shown in Table 6.

TABLE 6

| | Leakage Current at 300 Vdc (μA) |
|---|---|
| E1 | 0.5 |
| E2 | 0.5 |
| E3 | 0.5 |
| E4 | 0.5 |
| E5 | 0.5 |
| E6 | 0.5 |
| E7 | 0.5 |
| E8 | 0.5 |
| CE1 | 1.1 |
| CE2 | 0.8 |
| CE3 | 1.1 |
| CE4 | 1.0 |
| CE5 | 1.0 |
| CE6 | 1.0 |
| CE7 | 1.0 |
| CE8 | 0.8 |
| CE9 | 0.8 |
| CE10 | 0.9 |
| CE11 | 0.9 |
| CE12 | 0.9 |
| CE13 | 0.9 |
| CE14 | 0.9 |
| CE15 | 0.9 |
| CE16 | 0.9 |
| CE17 | 0.9 |

As shown in Table 6, the maximum leakage current of each of the test devices of E1 to E8 is 0.5 μA, and the maximum leakage current of each of the test devices of CE1 to CE17 is 0.8 μA to 1.1 μA. The maximum leakage current of the test devices of E1 to E8 is smaller than the maximum leakage current of the test devices of CE1 to CE17. This may be due to the fact that, as compared to the test devices of CE1 to CE17, the resistance of each of the test devices of E1 to E8 was increased when the MOV-1 was electrically connected to the PPTC chip in series and when the GDT 2 was electrically connected to the PPTC chip in series (i.e., Layout of FIG. 1) or was electrically connected to the series connection of the PPTC chip and the MOV in parallel (i.e., Layout of FIG. 3). As such, when each of the test devices of E1 to E8 was subjected to a working voltage of 300 Vdc, the maximum leakage current was reduced and was smaller than the maximum leakage current of each of the test devices of CE1 to CE17.

High Current Impulse Test

Ten hybrid circuit protection devices of each of E1 to E8 and CE1 to CE17, serving as test devices, were subjected to a high current impulse test.

The high current impulse test was performed using a multiple impulse generator (MIG0624LP1, EMC Partner™). Specifically, the high current impulse test for each test device was conducted under 25° C. in the presence of a voltage that is greater than the varistor voltage of the MOV-1 and/or the MOV-2 (i.e., 600 Vdc, 650 Vdc, 700 Vdc, and 750 Vdc) and an over-current for the PPTC chip (i.e., 6500 A) (current waveform: 8/20 μs). The results are shown in Table 7. It should be noted that the MOV-2 has a varistor voltage greater than that of the MOV-1 as determined at 1 mA, and the GDT has a breakdown voltage greater than a varistor voltage of the MOV-1 as determined at 1 mA.

TABLE 7

| | High current impulse test (8/20 μs) | | | |
|---|---|---|---|---|
| | 600 V at 6500 A | 650 V at 6500 A | 700 V at 6500 A | 750 V at 6500 A |
| E1 | Pass | Pass | Pass | Pass |
| E2 | Pass | Pass | Pass | Pass |
| E3 | Pass | Pass | Pass | Pass |
| E4 | Pass | Pass | Pass | Pass |
| E5 | Pass | Pass | Pass | Pass |
| E6 | Pass | Pass | Pass | Pass |
| E7 | Pass | Pass | Pass | Pass |
| E8 | Pass | Pass | Pass | Pass |
| CE1 | MOV-1 Burned | MOV-1 Burned | MOV-1 Burned | MOV-1 Burned |
| CE2 | GDT Burned | GDT Burned | GDT Burned | GDT Burned |
| CE3 | Pass | Pass | Pass | MOV-2 Burned |
| CE4 | Pass | Pass | Pass | MOV-1 Burned |
| CE5 | Pass | Pass | Pass | MOV-1 Burned |
| CE6 | Pass | Pass | Pass | MOV-1 Burned |
| CE7 | Pass | Pass | Pass | MOV-1 Burned |
| CE8 | Pass | Pass | Pass | GDT Burned |
| CE9 | Pass | Pass | Pass | GDT Burned |
| CE10 | Pass | Pass | Pass | MOV-2 Burned |
| CE11 | Pass | Pass | Pass | MOV-2 Burned |
| CE12 | Pass | Pass | Pass | MOV-2 Burned |
| CE13 | Pass | Pass | Pass | MOV-2 Burned |
| CE14 | Pass | Pass | Pass | MOV-2 Burned |
| CE15 | Pass | Pass | Pass | MOV-2 Burned |
| CE16 | Pass | Pass | Pass | MOV-2 Burned |
| CE17 | Pass | Pass | Pass | MOV-2 Burned |

As shown in Table 7, the test devices of CE1 and CE2 respectively containing only one of the MOV-1 and the GDT 2 were burned out under the over-current of 6500 A and the over-voltage of greater than the clamping voltage of MOV-1 (595 V) or the breakdown voltage of the GDT 2 (420 V), and such damage from the burn-out cannot be repaired. In addition, the test device of CE3 containing only the MOV-2 was burned out under the over-current of 6500 A and the over-voltage that is greater than the clamping voltage of the MOV-2 (710 V). Moreover, the test devices of CE4 to CE9 containing the PPTC chip and one of the MOV-1 and the GDT 2 were burned out under the over-current of 6500 A and the over-voltage of 750V. Additionally, the test devices of CE10 to CE17 containing the PPTC chip, the MOV-1, and the MOV-2, with the GDT 2 of E1 to E8 being replaced by MOV-2, were burned out under the over-current of 6500 A and the over-voltage of 750 V. In contrast, all of the test devices of E1 to E8 containing the combination of the PPTC chip, the MOV-1 and the GDT 2 passed the high current impulse test without being burned out. This may be due to the fact that the MOV-1 is electrically connected to the PPTC chip in series and the GDT 2 is electrically connected to the PPTC chip in series (i.e., Layout of FIG. 1) or was electrically connected to the series connection of the PPTC chip and the MOV in parallel (i.e., Layout of FIG. 3).

Surge Immunity Test

Ten hybrid circuit protection devices of each of E1 to E8 and CE1 to CE17, serving as test devices, were subjected to a surge immunity test.

Specifically, the surge immunity test for each test device was conducted in the presence of a voltage (i.e., 600 Vac and 700 Vac) that is greater than the varistor voltage of the MOV(s) or a breakdown voltage of the GDT 2 and a current of 0.5 A, or an over-current for the PPTC chip (i.e., 10 A), by switching on for 60 seconds and then switching off. If all of the PPTC chip, GDT 2 and the MOV(s) were not burned out and damaged, the test device was determined to pass the surge immunity test, and the time at which the PPTC chip of the test device tripped (i.e., trip time), if any, was recorded. If one of the PPTC chip, the GDT 2, and the MOV(s) was burned out, the test device was determined to be burned out, and the time at which the PPTC chip, the GDT 2, or the MOV(s) was burned out (i.e., burned-out time) was recorded. The results are shown in Table 8.

TABLE 8

| | 600 V/0.5 A | | 600 V/10 A | | 700 V/0.5 A | | 700 V/10 A | |
|---|---|---|---|---|---|---|---|---|
| | Time (s) | Result | Time (s) | Result | Time (s) | Result | Time (s) | Result |
| E1 | 2.885 | Pass | 0.245 | Pass | 1.820 | Pass | 0.190 | Pass |
| E2 | 2.875 | Pass | 2.495 | Pass | 1.815 | Pass | 0.185 | Pass |
| E3 | 2.815 | Pass | 0.225 | Pass | 1.705 | Pass | 0.160 | Pass |
| E4 | 2.810 | Pass | 2.220 | Pass | 1.695 | Pass | 0.155 | Pass |
| E5 | 2.835 | Pass | 0.230 | Pass | 1.790 | Pass | 0.170 | Pass |
| E6 | 2.830 | Pass | 0.225 | Pass | 1.785 | Pass | 0.165 | Pass |
| E7 | 2.525 | Pass | 0.195 | Pass | 1.415 | Pass | 0.125 | Pass |
| E8 | 2.520 | Pass | 0.190 | Pass | 1.405 | Pass | 0.120 | Pass |
| CE1 | 5.180 | MOV-1 Burned | 0.960 | MOV-1 Burned | 4.985 | MOV-1 Burned | 0.865 | MOV-1 Burned |
| CE2 | 8.195 | GDT Burned | 3.075 | GDT Burned | 7.460 | GDT Burned | 2.985 | GDT Burned |
| CE3 | 6.220 | MOV-2 Burned | 1.105 | MOV-2 Burned | 5.495 | MOV-2 Burned | 0.990 | MOV-2 Burned |
| CE4 | 3.295 | Pass | 0.470 | Pass | 2.230 | Pass | 0.415 | Pass |
| CE5 | 3.285 | Pass | 0.465 | Pass | 2.225 | Pass | 0.410 | Pass |
| CE6 | 3.275 | Pass | 0.450 | Pass | 2.215 | Pass | 0.405 | Pass |
| CE7 | 3.265 | Pass | 0.440 | Pass | 2.200 | Pass | 0.400 | Pass |
| CE8 | 3.080 | Pass | 0.440 | Pass | 2.015 | Pass | 0.385 | Pass |
| CE9 | 3.070 | Pass | 0.435 | Pass | 2.010 | Pass | 0.380 | Pass |
| CE10 | 3.280 | Pass | 0.460 | Pass | 2.215 | Pass | 0.405 | Pass |
| CE11 | 3.270 | Pass | 0.455 | Pass | 2.210 | Pass | 0.400 | Pass |
| CE12 | 3.260 | Pass | 0.440 | Pass | 2.200 | Pass | 0.395 | Pass |
| CE13 | 3.255 | Pass | 0.435 | Pass | 2.190 | Pass | 0.395 | Pass |
| CE14 | 3.270 | Pass | 0.410 | Pass | 2.205 | Pass | 0.355 | Pass |
| CE15 | 3.260 | Pass | 0.405 | Pass | 2.200 | Pass | 0.350 | Pass |
| CE16 | 3.250 | Pass | 0.390 | Pass | 2.190 | Pass | 0.345 | Pass |
| CE17 | 3.245 | Pass | 0.385 | Pass | 2.180 | Pass | 0.345 | Pass |

As shown in Table 8, the test devices of CE1 to CE3 containing only one of the MOV-1, GDT, and MOV-2 were burned out within about 8 seconds under the over-current of 0.5 A and the over-voltage, or burned out within about 3 seconds under the over-current of 10 A and the over-voltage, and such damage cannot be repaired. In contrast, all of the test devices of E1 to E8 and CE4 to CE17 containing the combination of the PPTC chip and at least one of the MOV-1, GDT 2, and the MOV-2 passed the surge immunity test without being burned out. This is due to the PPTC chip having a short trip time and being able to withstand high voltage. In addition, as compared to CE 4 to CE 17, the inclusion of the GDT 2 in the test devices of E1 to E8 improves the heat transfer, which may shorten the time period for the PPTC chip to be tripped. Moreover, as compared to E1 and E5, formation of the hole in the PPTC chip and/or the MOV-1 in E2 to E4 and E6 to E8 further improves heat transfer, which may further shorten the time period for the PPTC chip to be tripped, and thus prevents the over-current from flowing through the MOV-1 and the GDT 2, thereby protecting the MOV-1 and the GDT 2 of the test device from being burned out. Furthermore, as compared to E1 to E4, the addition of the third conductive lead 83 between the GDT 2 and the MOV-1 in E5 to E8 may further accelerate heat transfer to further shorten the time period for the PPTC chip to be tripped. In other words, in the test devices of E1 to E8, the PPTC chip trips before the MOV-1 or the GDT 2 burns out in the presence of an over-current and a voltage that is greater than the varistor voltage of the MOV-1 or the breakdown voltage of the GDT 2.

In conclusion, by including the GDT 2 and the voltage-dependent resistor 3 and by making the PTC component 1, MOV-1, and the GDT 2 be electrically connected in the way described above, the GDT 2 and the voltage-dependent resistor 3 are cooperatively capable of protecting each other from being burned out under an over-current, an over-voltage, or a power surge condition in a short period of time, and thus the hybrid circuit protection device of this disclosure may be repeatedly used without being damaged, which demonstrates its excellent durability and reliability.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A hybrid circuit protection device, comprising:
   a positive temperature coefficient (PTC) component;
   a voltage-dependent resistor;
   a gas discharge tube (GDT); and
   first and second conductive leads that are respectively connected to said PTC component and said GDT,
   wherein
   said voltage-dependent resistor and said PTC component are electrically connected in series,
   said GDT is electrically connected to said voltage-dependent resistor and said PTC component, and
   said GDT has a breakdown voltage greater than a varistor voltage of said voltage-dependent resistor as determined at 1 mA.

2. The hybrid circuit protection device as claimed in claim 1, wherein:
   said GDT is electrically connected to the series connection of said PTC component and said voltage-dependent resistor in parallel; and
   said voltage-dependent resistor is sandwiched between said PTC component and said GDT.

3. The hybrid circuit protection device as claimed in claim 1, wherein said breakdown voltage of said GDT is greater than 110% of said varistor voltage of said voltage-dependent resistor as determined at 1 mA.

4. Hybrid circuit protection device as claimed in claim 1, wherein said breakdown voltage of said GDT is greater than 116% of said varistor voltage of said voltage-dependent resistor as determined at 1 mA.

5. The hybrid circuit protection device as claimed in claim 1, wherein:
   said PTC component includes
     a PTC layer that has two opposite surfaces, and
     first and second electrode layers that are respectively disposed on said two opposite surfaces of said PTC layer, each of said first and second electrode layers having a peripheral edge;
   said GDT includes
     a GDT body that has two opposite surfaces, and
     third and fourth electrode layers that are respectively disposed on said two opposite surfaces of said GDT body, each of said third and fourth electrode layers having a peripheral edge;
   said voltage-dependent resistor includes
     a voltage-dependent resistor layer that has two opposite surfaces,
     a fifth electrode layer that is disposed on one of said two opposite surfaces of said voltage-dependent resistor layer and is adjacent to said second electrode layer of said PTC component, and
     a sixth electrode layer that is disposed on the other one of said two opposite surfaces of said voltage-dependent resistor layer and is adjacent to said third electrode layer of said GDT, each of said fifth and sixth electrode layers having a peripheral edge;
   said first conductive lead is connected to said fourth electrode layer of said GDT, and said second conductive lead is connected to said first electrode layer of said PTC component; and
   said voltage-dependent resistor is sandwiched between said PTC component and said GDT.

6. The hybrid circuit protection device as claimed in claim 5, further comprising a third conductive lead that is connected and is disposed between said third electrode layer of said GDT and said sixth electrode layer of said voltage-dependent resistor.

7. The hybrid circuit protection device as claimed in claim 5, wherein each of said first and second electrode layers of said PTC component has a surface having a surface area not greater than 90% of a surface area of a corresponding one of said two opposite surfaces of said PTC layer on which said each of said first and second electrode layers is disposed.

8. The hybrid circuit protection device as claimed in claim 5, wherein each of said fifth and sixth electrode layers of said voltage-dependent resistor has a surface having a surface area not greater than 90% of a surface area of a corresponding one of said two opposite surfaces of said voltage-dependent resistor layer on which each of said fifth and sixth electrode layers is disposed.

9. The hybrid circuit protection device as claimed in claim 5, wherein:
  each of said first and second electrode layers of said PTC component has a surface having a surface area not greater than 90% of a surface area of a corresponding one of said two opposite surfaces of said PTC layer on which said each of said first and second electrode layers is disposed; and
  each of said fifth and sixth electrode layers of said voltage-dependent resistor has a surface having a surface area not greater than 90% of a surface area of a corresponding one of said two opposite surfaces of said voltage-dependent resistor layer on which each of said fifth and sixth electrode layers is disposed.

10. The hybrid circuit protection device as claimed in claim 1, wherein said PTC component is a polymer PTC (PPTC) component.

11. The hybrid circuit protection device as claimed in claim 1, wherein said PTC component trips before said GDT burns out in the presence of an over-current or an over-voltage.

12. Hybrid circuit protection device as claimed in claim 1, wherein said PTC component trips before said voltage-dependent resistor burns out in the presence of an over-current or an over-voltage.

13. The hybrid circuit protection device as claimed in claim 1, wherein said PTC component trips within 0.00001 seconds to 10 seconds in the presence of an over-current or an over-voltage.

14. The hybrid circuit protection device as claimed in claim 1, wherein said PTC component trips within 0.001 seconds to 10 seconds in the presence of an over-current that is not less than 0.5 A and an over-voltage that is greater than a varistor voltage of said voltage-dependent resistor or a breakdown voltage of said GDT.

15. The hybrid circuit protection device as claimed in claim 1, wherein said PTC component trips within 0.001 seconds to 10 seconds in the presence of an over-current that is not less than 10 A and an over-voltage that is greater than a varistor voltage of said voltage-dependent resistor or a breakdown voltage of said GDT.

16. The hybrid circuit protection device as claimed in claim 1, wherein said voltage-dependent resistor includes a hole formed therein.

17. The hybrid circuit protection device as claimed in claim 1, wherein said PTC component includes a hole formed therein.

18. The hybrid circuit protection device as claimed in claim 5, wherein said PTC layer has a composition including a non-grafted olefin-based polymer and a conductive filler.

19. The hybrid circuit protection device as claimed in claim 18, wherein said composition of said PTC layer further includes a grafted olefin-based polymer.

20. The hybrid circuit protection device as claimed in claim 18, wherein said non-grafted olefin-based polymer is high density polyethylene (HDPE).

21. The hybrid circuit protection device as claimed in claim 18, wherein said conductive filler is selected from the group consisting of carbon black, metal powders, and conductive ceramic powders.

22. The hybrid circuit protection device as claimed in claim 1, wherein said voltage-dependent resistor includes metal oxide.

23. The hybrid circuit protection device as claimed in claim 1, further comprising an encapsulant enclosing said PTC component, said GDT, said voltage-dependent resistor, and a portion of each of said first and second conductive leads.

24. The hybrid circuit protection device as claimed in claim 23, wherein said encapsulant is made of epoxy resin.

* * * * *